United States Patent [19]

Vanderspurt et al.

[11] 4,256,675
[45] Mar. 17, 1981

[54] METHOD FOR GENERATING SUPER ATMOSPHERIC PRESSURES OF SENSITIVE MATERIALS IN A GAS STREAM

[75] Inventors: Thomas H. Vanderspurt, Gillette, N.J.; Paul D. Taylor, Corpus Christi, Tex.

[73] Assignee: Celanese Corporation, New York, N.Y.

[21] Appl. No.: 955,594

[22] Filed: Oct. 30, 1978

Related U.S. Application Data

[62] Division of Ser. No. 819,750, Jul. 28, 1977, Pat. No. 4,190,620.

[51] Int. Cl.³ ............................................... B01J 8/00
[52] U.S. Cl. .................................... 261/128; 261/148; 261/149; 261/151; 261/152; 203/1; 203/8; 203/49; 260/465.9; 560/205
[58] Field of Search .................. 560/205; 260/465.9; 202/234, 236, 181, 176; 203/1, 49, DIG. 25, 8, 9, 90, DIG. 6, 26, 95, 96, 92, 93, 97; 23/252 R, 283; 159/48 R, 4 CC, 4 R; 422/187; 261/148, 149, 151, 152, 117, 36 R

[56] References Cited

U.S. PATENT DOCUMENTS

| | | | |
|---|---|---|---|
| 1,881,718 | 10/1932 | Lawrie | 203/96 |
| 1,921,157 | 8/1933 | Heath et al. | 203/97 |
| 2,344,791 | 3/1944 | Stoesser | 203/97 |
| 2,386,058 | 10/1945 | Patterson et al. | 203/96 |
| 2,487,184 | 11/1949 | Rupp | 203/97 |
| 2,916,512 | 12/1959 | Fisher et al. | 560/205 |
| 2,985,686 | 5/1961 | Bueche et al. | 203/92 |
| 3,094,552 | 6/1963 | Wood | 260/465.9 |
| 3,409,515 | 11/1968 | Baird et al. | 203/49 |
| 3,414,484 | 12/1968 | Carson et al. | 203/26 |
| 3,883,642 | 5/1975 | Franke et al. | 203/49 |
| 3,914,290 | 10/1975 | Otsuki et al. | 560/205 |
| 4,018,816 | 4/1977 | Onoda et al. | 560/205 |
| 4,156,633 | 5/1979 | Horlenko et al. | 203/93 |

Primary Examiner—Wilbur L. Bascomb, Jr.
Attorney, Agent, or Firm—Kenneth A. Genoni

[57] ABSTRACT

Apparatus and processes are disclosed for converting sensitive organic compounds such as acrolein, methacrolein, acrylic acid and methacrylic acid from liquid to vapor in admixture with a gas stream at super-atmospheric pressures with minimum decomposition and substantially without polymer formation. The acrolein and methacrolein partial pressures being up to super-atmospheric and those of acrylic and methacrylic acids up to about an atmosphere.

An apparatus and a process are also disclosed for transferring a sensitive organic material in an energy-efficient manner from a low-pressure, high-temperature gas-vapor stream to a solvent for the sensitive material, and then to another gas stream at increased pressure.

23 Claims, 2 Drawing Figures

METHOD FOR GENERATING SUPER-ATMOSPHERIC PRESSURES OF SENSITIVE MATERIALS IN A GAS STREAM

This is a division of application Ser. No. 819,750, filed July 28, 1977, now U.S. Pat. No. 4,190,620.

BACKGROUND OF THE INVENTION

1. Field of the Invention

This invention relates to processes for providing vaporized streams of sensitive organic materials. It particularly relates to processes for generating vapor streams of polymerizable organic compounds having a boiling point in the range between about 50° and 200° C., at super-atmospheric pressures with minimum polymerization. In a specific embodiment, this invention relates to a process for vaporizing acrolein in a gas stream with minimum polymerization and decomposition.

2. Review of the Prior Art

Acrolein is a sensitive material which is used as the raw material for preparing acrylonitrile and numerous other industrially important materials. As disclosed in U.S. Pat. Nos. 2,412,437; 2,836,614; 3,094,552; and 3,179,694 for example, acrylonitrile is prepared by catalytically reacting a mixture of acrolein and air with ammonia in vapor phase.

Such vapor phase streams are preferably at superatmospheric pressures and elevated temperatures, conditions that often promote polymerization of reactive olefinically unsaturated organic components within pipelines and other process equipment and eventually cause blockage of entire systems. Consequently, there is a need for a process for vaporizing acrolein and other sensitive materials to be fed at a selected pressure into a vapor phase hydrogenation or oxidation reactor.

Furthermore, a sensitive material is often available as a component of one gas or vapor stream whereas it is needed as a component of another gas or vapor stream at a different pressure and/or temperature. Making such a transfer from one gas stream to another through conventional absorption and heat-exchange equipment can be wasteful of energy and can result in substantial material loss if the sensitive material is readily polymerizable.

SUMMARY OF THE INVENTION

It is an object of this invention to provide an apparatus and process for generating a vapor stream of a sensitive organic material with a composition and pressure which facilitate further vapor phase reactions without extensive decomposition or polymerization of the sensitive organic material.

It is another object of this invention to provide an apparatus and process wherein a sensitive organic material is vaporized and provided as a high-pressure stream for introduction to a reactor.

It is another object of this invention to provide a process for generating a gas stream of acrolein at super-atmospheric pressure with minimum loss of acrolein by decomposition and polymerization.

It is a further object of this invention to provide an energy efficient process for transferring a sensitive organic material such as acrolein, methacrolein, acrylic acid or methacrylic acid from a low pressure-high temperature gas stream (e.g., the effluent from a selective oxidation reactor) to a super-atmospheric gas stream such as the feed for a selective hydrogenation reactor in the case of acrolein or methacrolein, or an esterification reactor in the case of acrylic acid or methacrylic acid.

In satisfaction of these objects and according to the principles of this invention, vaporization and transference systems, including apparatuses and continuous processes used therewith, are herein described for:

A. converting a liquid stream of a sensitive organic material to a vaporized stream thereof at a selectively high pressure with minimum loss of sensitive material by polymer formation or by decomposition; and B. transferring vaporized sensitive organic material in an energy-efficient manner from a low pressure-high temperature gas stream to another gas stream at increased pressure.

These systems are generally based on moving a carrier gas countercurrently to the sensitive material. They are particularly useful with acrolein, methacrolein, acrylic acid and methacrylic acid feed streams.

The vaporization apparatus comprises a vaporizing tower generally having a heating means along its upper portion and a cooling means along its lower portion; a recirculation pump in a recirculation line which is connected to the bottom of the tower and to the liquid feed line for the sensitive material; a carrier gas inlet means which is connected to a carrier gas feed line at the bottom of the tower; a liquid dispersal means which is connected to the liquid feed line at the top of the tower; and a vapor take-off from the tower which has a demisting device therein.

The transference apparatus comprises a similar vaporizing tower, gas sparger, recirculation pump and line, liquid spray nozzle and vapor take-off line, but additionally includes a scrubbing tower having its own cooling means, sparger, pump, and liquid spray means. In addition, the scrubbing tower is connected to a precooler for an incoming gas stream (at low pressure and high temperature) which is relatively rich in the sensitive material. The recirculation line from the scrubbing tower is connected to the bottom of the scrubbing tower and to the liquid feed line for the vaporizing tower, but the recirculation line from the vaporizing tower is connected to the spray device for the scrubbing tower. The precooler is preferably connected to the cooling means for the vaporizing tower in order to obtain countercurrent cooling.

The vaporization process is described hereinafter in terms of two process embodiments:

1. a low-pressure spray process is employed in which the vaporizing tower is under atmospheric pressure or vacuum, little heating is performed, and minimum or no solvent is used. The relatively cool sensitive material is vigorously circulated and vaporized at relatively high pressure drop from the spray device and a high-performance blower in the vapor take-off line is used to compress the vapor to operating pressure.

2. a high-pressure spray process is employed in which the vaporizing tower is under the full operating pressure that is desired in the vapor take-off line, and a selected solvent is circulated by the circulating pump and lines at a ratio by weight of about 0.2–5:1 of solvent to sensitive material. The droplets emitted from the spray device are heated by the countercurrent stream of hot gas which is heated by the upper walls of the tower, and the liquid pool in the bottom of the tower is cooled while the carrier gas from the sparger bubbles therethrough.

The high-pressure process, for converting a sensitive material from a liquid state to a vapor state at an elevated pressure and in combination with a carrier gas, more specifically comprises:

A. passing the sensitive material, as part of a liquid mixture in the form of liquid droplets, downwardly through a primary vaporization stage which is maintained at a selected pressure, and countercurrently to an ascending carrier gas, while heating the sensitive material through contact with the gas which is heated to vaporize at least a portion of the sensitive material and form a vapor-gas mixture;

B. removing the vapor-gas mixture from the primary vaporization stage;

C. collecting the unvaporized portion of the sensitive material in a liquid pool;

D. generating a stream of bubbles of the gas at the bottom of the liquid pool as a secondary vaporization or stripping stage; and E. cooling and circulating the contents of the pool to, and mixing with, the sensitive material in its liquid state to form the liquid mixture, before passage thereof to the primary vaporization stage.

The liquid dispersal means to which the liquid mixture is fed, preferably is a liquid spray device for creating droplets with a large liquid surface in contact with the ascending carrier gas. In the form of a liquid spray nozzle, it directs a spray of fine droplets of the liquid mixture downwardly, with little or no contact with the heated walls of the tower, into the primary vaporization stage which is at a selected pressure. Preferably, the pressure is maintained at a super-atmospheric level.

More specifically, liquid sensitive organic material moves downwardly as droplets within the primary vaporization stage and countercurrently to an ascending stream of gas which functions as a carrier, a dispersant, and a heat-transfer agent. The liquid sensitive material evaporates, either partially or substantially fully, as the gas passes countercurrently thereto. Unvaporized liquid sensitive material forms a liquid pool, through which the carrier gas is sparged and functions as a secondary vaporization stage.

The liquid pool consists of an inert high-boiling solvent, sensitive material, inhibitors, antifoam agents, and the like. As the gas bubbles through the liquid pool, it strips the solvent medium of some of the dissolved sensitive material. The liquid pool is continuously cooled, and it is additionally cooled while being circulated for mixing with incoming fresh sensitive material so that the mixture is at a temperature that minimizes polymer formation or decomposition. Thus, the sensitive material in the liquid feed line is mixed with the recirculating contents of the liquid pool, (i.e., solvent that is substantially stripped of the sensitive material), and the resultant liquid mixture is fed to the spray nozzle. When employed with acrolein as the sensitive material, the solvent should have a boiling point of at least 75° C., and preferably in the range between about 200°–350° C.

When the sensitive material is acrolein, methacrolein, acrylic acid, or methacrylic acid which is produced by vapor phase oxidation and is present as vapor in the effluent stream of an oxidation reaction, a solvent spray can be used to cool and scrub the desired sensitive material out of the gas-vapor stream in an absorption or scrubbing tower or towers of a transference apparatus of this invention, so that this solvent-sensitive material mixture can then be pumped to the vaporizing tower. In such a solvent-sensitive material combination, the incorporation of antioxidants, polymerization inhibitors, and antifoaming agents is highly preferred.

The pressure in the scrubbing tower and in the vaporizing tower can differ considerably. For example, in a plant where the sensitive material is acrolein which is to be fed to a hydrogenation unit, the pressure in the scrubbing tower is typically one atmosphere or slightly above, and the pressure in the vaporizing tower is about 100 atmospheres.

The vaporization tower is under pressure such that the pressure down stream from the demisting device is at the desired level. The liquid mixture containing the inert high-boiling solvent and the sensitive material is introduced through a downwardly directed spray head or heads. The spray stream does not substantially contact the heated portion of the tower inner surface, and the spray is not fine enough to be substantially entrained in the rising carrier gas stream while still of sufficiently low cross section to be rapidly heated by the gas stream. The gas stream in turn is heated by conduction through the gas from the tower's upper wall surface. As the spray mass descends, the sensitive material is transferred from the drops to the carrier gas which becomes increasingly enriched as it ascends in the tower. The partially depleted spray mass is collected in a liquid pool, where the carrier gas is introduced through a sparger system which functions to vaporize and absorb additional sensitive material from the liquid pool. The liquid pool is cooled so that polymerization or decomposition of the sensitive material is minimized. The liquid pool is then circulated through a mixing tee where additional sensitive material is metered in and thence back to the spary head(s) at the top of the vaporization tower.

The liquid pool preferably consists of between about 20 and 90 weight percent of an inert high-boiling solvent for the sensitive organic material. The height of the liquid level of the pool is measured and controlled, and make-up solvent is added in accordance therewith. The carrier gas is generally inert to the sensitive material but may be selectively reactive thereto under conditions not prevailing in the primary and secondary vaporization stages within the vaporization tower.

When the sensitive material is to be added to the vaporization system as a liquid, the solvent may be advantageously chosen as one where the vapor pressure of the sensitive material, at a given temperature such as the maximum encountered in the vaporizer, is greater than that calculated by the mole fraction of sensitive material in the mixture multiplied by the vapor pressure of the pure sensitive material at the same temperature. In situations where the sensitive material can undergo thermal induced polymerization and the resulted polymer is significantly less polar than the sensitive material, a relatively nonpolar solvent capable of dissolving the desired quantity of sensitive material, and still fulfilling the other criteria, is the solvent of choice.

When the sensitive material is first to be adsorbed from another gas stream such as those emanating from a selective oxidation reactor, the solvent may require special properties. In this case, the vapor pressure of the pure sensitive material over a mixture of sensitive material and solvent is usually equal to or less than that calculated by the mole fraction of sensitive material in the mixture multiplied by the vapor pressure of the pure sensitive material. Hence, the solvent has a high affinity for the sensitive material, but not so high that the sensitive material cannot be advantageously released from the mixture in the vaporizer. The solvent may also be selected to have relatively low affinity for by-products present in the first stream (e.g., water). Under these conditions, a mixture of high-boiling solvents can be superior to a given pure material.

The process solvent system can be classified into two categories on the basis of volatility. Firstly, the solvent system can be essentially nonvolatile, though either a pure compound or a mixture of compounds. The vapor pressure of the solvent should be very small compared to that of the sensitive material, and should not act as a catalyst poison. The solvent also must be stable and chemically inert to the sensitive material. When the sensitive material is mixed with the solvent, the vapor pressure of the sensitive material over the mixture should not be significantly diminished from that calculated by multiplying the vapor pressure of the pure sensitive material at a given temperature by the mole fraction of the sensitive material in the mixture. Conversely, the vapor pressure of the solvent at a given temperature over the mixture of solvent and sensitive material should not be greatly enhanced over that calculated by multiplying the mole fraction of the solvent in the mixture by the vapor pressure of pure solvent at the same temperature. The solvent should also remain liquid over the expected range of operating conditions, and perform as a medium for additives such as polymerization inhibitors, anti-foam agents, oxidation inhibitors, and the like. Secondly, the solvent system can consist all or in part of a relatively volatile material which, while inert to the sensitive material under vaporization conditions, would be either a reactant or a co-reactant or a reaction modifier relative to the sensitive material under the conditions encountered in a subsequent reactor zone. In such a situation, a nonvolatile solvent can be included to function as a medium for the necessary additives.

When the sensitive material is acrolein or methacrolein, a suitable solvent can be selected from among the following groups:

(1) higher boiling alcohols and diols, e.g., ethylene glycol, propylene glycol, 1,4-butanediol, 2-methyl-1,3-propanediol, and the like;

(2) higher boiling esters, e.g., dibutyl phthalate, dioctyl phthalate, higher fatty acid esters of pentaerythritol, γ-butyrolactone, and the like;

(3) higher boiling ethers, e.g., 2-methoxyethylether, and the like;

(4) xylenes and higher boiling paraffinic substances;

(5) commercially available proprietary higher boiling stable solvents, e.g., Ucon oils, Dowex, carbowaxes, Dow-therm, and the like; and (6) special materials such as proprietary silicone oils, which may not form true solutions in all proportions but have some mutual miscibility, and form stable suspensions with the sensitive materials.

When the sensitive material is acrylic acid or methacrylic acid, a suitable solvent can be selected from among the following groups. For acrylic acid and methacrylic acid, a boiling point of at least 200° C. is preferred to minimize solvent loss:

(1) higher boiling esters, e.g., dibutyl phthalate, dioctyl phthalate, higher fatty acid esters of pentaerythritol, γ-butyrolactone, and the like;

(2) higher boiling aromatic or paraffinic substances;

(3) higher boiling phosphate esters, e.g., tri-o-cresyl phosphate, and the like;

(4) higher boiling aliphatic and aromatic ethers;

(5) commercially available proprietary higher boiling solvent compositions; and (6) special materials such as proprietary silicone oils, which may not form true solutions in all proportions but have some mutual miscibility, and form stable suspensions with the sensitive materials, for these systems, at higher acid levels two phases are present very well dispersed in each other; the acid-rich phase is responsible for most of the acid vapor pressure.

Antioxidants and/or polymerization inhibitors such as hydroquinone may also be added to the solvent, as well as antifoaming agents.

The solvent as well as any additives should have a vapor pressure substantially below that of the sensitive material, so as to minimize solvent loss and product contamination. A suitable filter may also be incorporated along the gas-vapor stream exit line to minimize solvent droplet entrainment in the stream.

If the process in which the sensitive material is to be employed requires a co-reactant which is relatively volatile but not sensitive to polymerization or decomposition and which does not react with the sensitive material under the volatilization conditions, it may be incorporated with or in place of the relatively nonvolative solvent. The final relative partial pressure of the sensitive material and of the nonsensitive co-reactant are controlled by adjusting their molar concentrations in the stream fed to the scrubbing tower, and by further adjusting the operating temperature of the scrubbing tower.

The dilution effect of the inert solvent or co-reactant, and the relatively short residence time at elevated temperatures, minimize or eliminate polymer formation. Any low molecular weight condensation products formed often become part of the solvent system.

DESCRIPTION OF THE INVENTION

Figure 1:
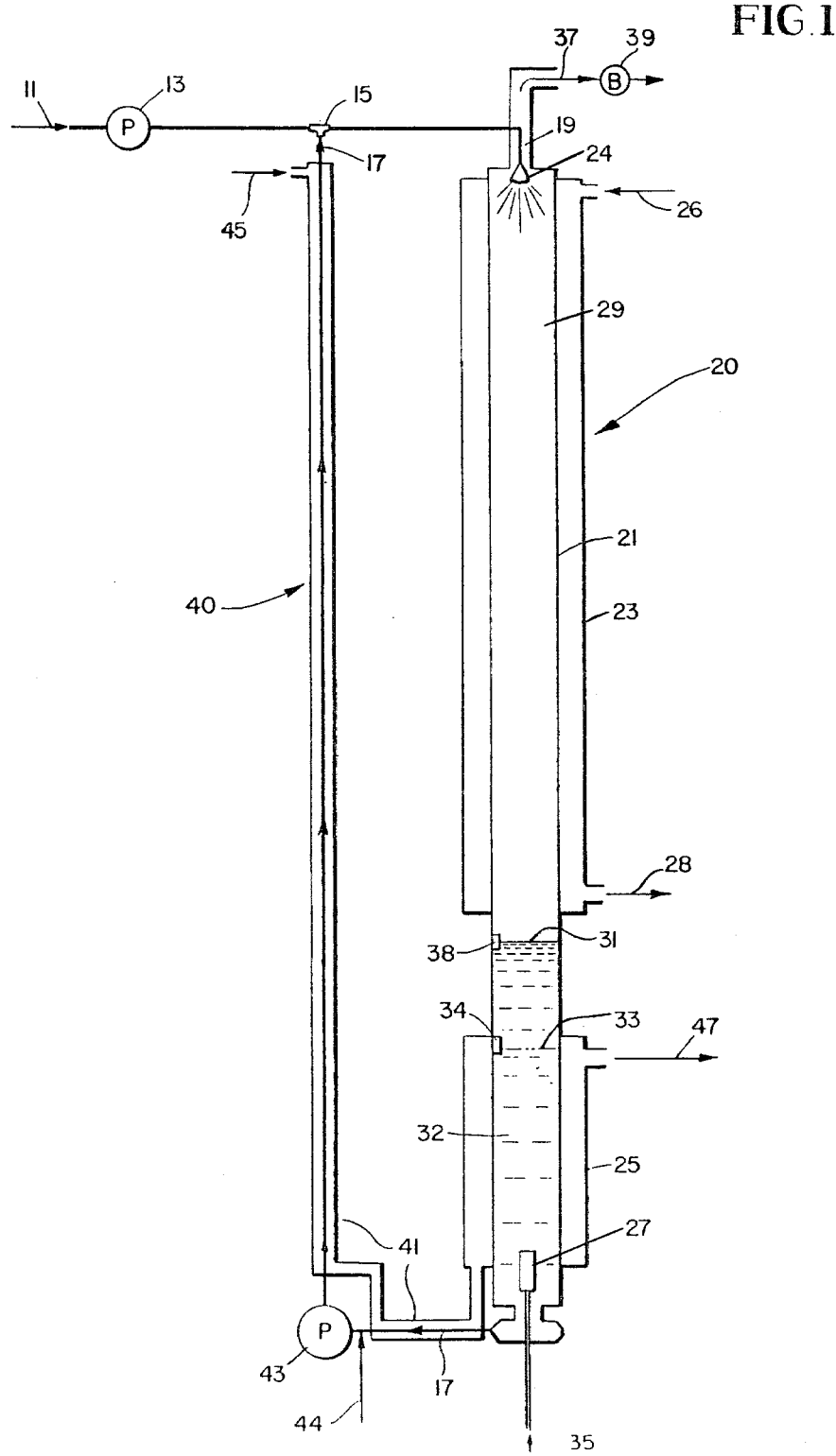
FIG. 1 illustrates a vaporization apparatus for converting a liquid supply of a sensitive material such as acrolein to a vapor state at a selected elevated pressure and in combination with a selected gas, such as a gas to be reacted with the sensitive material.

The apparatus in FIG. 1 is described hereinafter with respect to two process embodiments of the vaporization process for acrolein, as an example of a sensitive material. The first two embodiments differ with respect to use of a dispersal solvent. In both process embodiments, a carrier gas 35 enters the bottom of the vaporizing tower 20 through sparger 27, passes through pool 32 and primary stage 29 and leaves the top of the tower 20 in saturated condition with respect to acrolein.

The first process embodiment relates to spraying a stream of pure sensitive material such as acrolein into vaporizing tower 20 at ambient temperature and low pressure while very moderately heating the resultant droplets in the upper part of the tower; cooling the pool 32 of liquid sensitive material that accumulates in the bottom of the tower from the unvaporized droplets; and further cooling the liquid sensitive material while recycling it from the pool 32 in the bottom of the tower 20 to mix with the sensitive material feed stream 11 in mixing tee 15.

The descending droplets within space 29 are heated principally by contact with the gas which is in turn heated by contact with Shell 21 (i.e., the inner surface of the tower wall). This shell can be dimpled or finned to increase heat transfer surface, but this must be done in a way to prevent the collection of liquid pools which would polymerize on contact with the downwardly traveling droplet flow. However, because pure liquid acrolein and other sensitive materials can readily polymerize in contact with the heated inner surface of the tower wall, heating must be at mild temperatures, if at all.

Evaporation is facilitated by using low pressures within tower 20, but a high-performance blower 39 is needed in order to increase the acrolein/saturated carrier gas stream to desired operating pressures. This high performance blower must be so designed and heated that the compression of the gas/sensitive material steam does not result in the condensing of the sensitive material.

The second process embodiment is highly preferred and includes the use of a solvent for a sensitive material selected from acrolein, methacrolein, acrylic acid and methacrylic acid. At least 20 mole percent of the liquid pool 32 at the bottom of tower 20 is comprised of this solvent, as is the recycle stream 17. This solvent is inert under conditions of the tower and recycle stream, and usually contains selected additives such as antifoaming agents, polymerization inhibitors and antioxidants.

The following detailed description refers to the second process embodiment, with acrolein as a typical sensitive material. The apparatus in FIG. 1 comprises a metering pump 13 for pumping a stream of acrolein 11 from a supply thereof, a mixing tee 15 for mixing a recycle stream 17 therewith, a spray tower 20, and a cooling jacket 40. The mixed stream 19 is pumped to the top of the spray tower 20 through a liquid entrance nozzle 24 which is directed downwardly, and disperses the liquid 19 into fine droplets within the interior 29 of the tower having a shell 21 and a heating jacket 23 for heating the shell 21 with hot water, oil, or steam 26, 28. The droplets in general do not contact the heated portion of Shell 21.

A gas 35 enters at the bottom of the tower 20 through a porous gas inlet or sparger 27 which results in a stream of bubbles within pool 32 with good liquid/gas contact. Some of the volatile material, e.g., acrolein, in the liquid pool enters the vapor phase inside the rising gas bubbles, the equilibrium partial pressure of this volatile material being a function of the temperature and the molar concentration of the volatile material in the particular liquid system. The gas/acrolein vapor stream leaves the liquid pool at its surface 31 and encounters and is heated by the wall 21 of the tower 20 which may be finned to increase heat transfer area.

As this progressively warmer gas/acrolein or stream rises through primary stage 29, the counter-currently falling liquid droplets are heated. As the temperature of the vaporization system increases, acrolein enters the gas/acrolein stream from the liquid phase of the droplets. After the gas/acrolein stream reaches a steady state, which is a function of tower temperature, acrolein partial pressure, maximum molar concentration, droplet surface area, and residence time, it leaves the tower as exit stream 37 within a pipeline which is equipped with a demister in the demisting zone 36 and is maintained at a temperature above the dew point of the acrolein in the gas/vapor stream but below temperatures which cause pyrolysis of the acrolein.

The spray head 24 and the pressure produced by pumps 13 and 43 should be such that the liquid droplets are relatively small, so as to provide good gas-liquid contact, and of a small mass so that they are rapidly warmed by the rising gas/vapor stream. The droplets should not be so small, however, as to be entrained physically in the stream and carried along through the exit pipeline.

The unvaporized portions of the droplets descend downwardly and countercurrently to the ascending gas, and form a pool 32 of liquid having a surface level 33 when there is no sparging and a higher surface level 31 under sparging conditions. The liquid pool having level 31 is cooled by water in the tower jacket 25. This water enters a cooling system 40 as cooling water 45 and flows countercurrently to flow of recycle stream 17 which is pumped through the cooling jacket 40 by pump 43.

The gas 35 can be an inert gas or it can be a reactive gas for catalytic reaction with the acrolein. When the gas leaves the sparger 27 as fine bubbles, it strips some of the acrolein as a vapor from the liquid and passes upwardly and countercurrently to the descending droplets, while being heated by wall 21 and receiving increasing amounts of acrolein vapor.

Although the system shown in the drawing is operable on pure acrolein by proper adjustment of heat and pressure, it is highly preferred that spray tower 20 be partially filled with an inert high-boiling solvent for acrolein, so that stream 17 is at least 20 mole percent solvent. The inert solvent prevents or minimizes polymer formation and blockage of the system by the sensitive material, and therefore enables relatively high temperatures (up to 200° C. for acrolein) to be used in the jacket 23, thereby increasing tower capacity.

When a sensitive material is used without a solvent according to the first process embodiment, stream 19 is at pressure only sufficient to overcome liquid head, nozzle resistance and internal gas pressure. The primary stage 29 may be at, slightly below, or slightly above atmospheric pressure. A substantial part of the evaporation of the heat-sensitive material occurs within the liquid pool 32. Process conditions are varied as to temperatures, pressures, and flow rates so that the gas/vapor stream 37 is saturated with the sensitive material. The tower wall surface 21 is at a relatively low temperature such as 70° C. (using hot water instead of steam in jacket 23), and the liquid pool 32 at the bottom of the spray tower 20 is pure sensitive material at a relatively low temperature so that it needs to be cooled only slightly, if at all, with tower jacket 25 and cooling jacket 40. It is sometimes advantageous to provide a heating means for slightly heating the gas stream 35. The first process embodiment generally requires a compressor for feeding the gas-vapor stream 37 to a catalytic reactor. Care must be taken to prevent condensation of uninhibited sensitive material.

When the liquid pool having levels 31, 33 contains large proportions of an inert solvent according to the second process embodiment, the temperature in jacket 23, using pressurized steam 26, is as high as possible for rapid vaporization of the sensitive material. Because some of the solvent is necessarily being constantly evaporated, make-up solvent is preferably continuously added as stream 44. The height of the liquid 31 is measured by a liquid level detector 34 which is an electrical contact device, a static-pressure device, or any other device known to the art. Alternatively, a float-activated liquid-level instrument 38 is suitably positioned for continuously indicating and recording the height of liquid level 33 when gas 35 is not being admitted to sparger 27. Preferably, data on both levels is obtained as a check on the efficiency of operating the tower 20.

Figure 2:
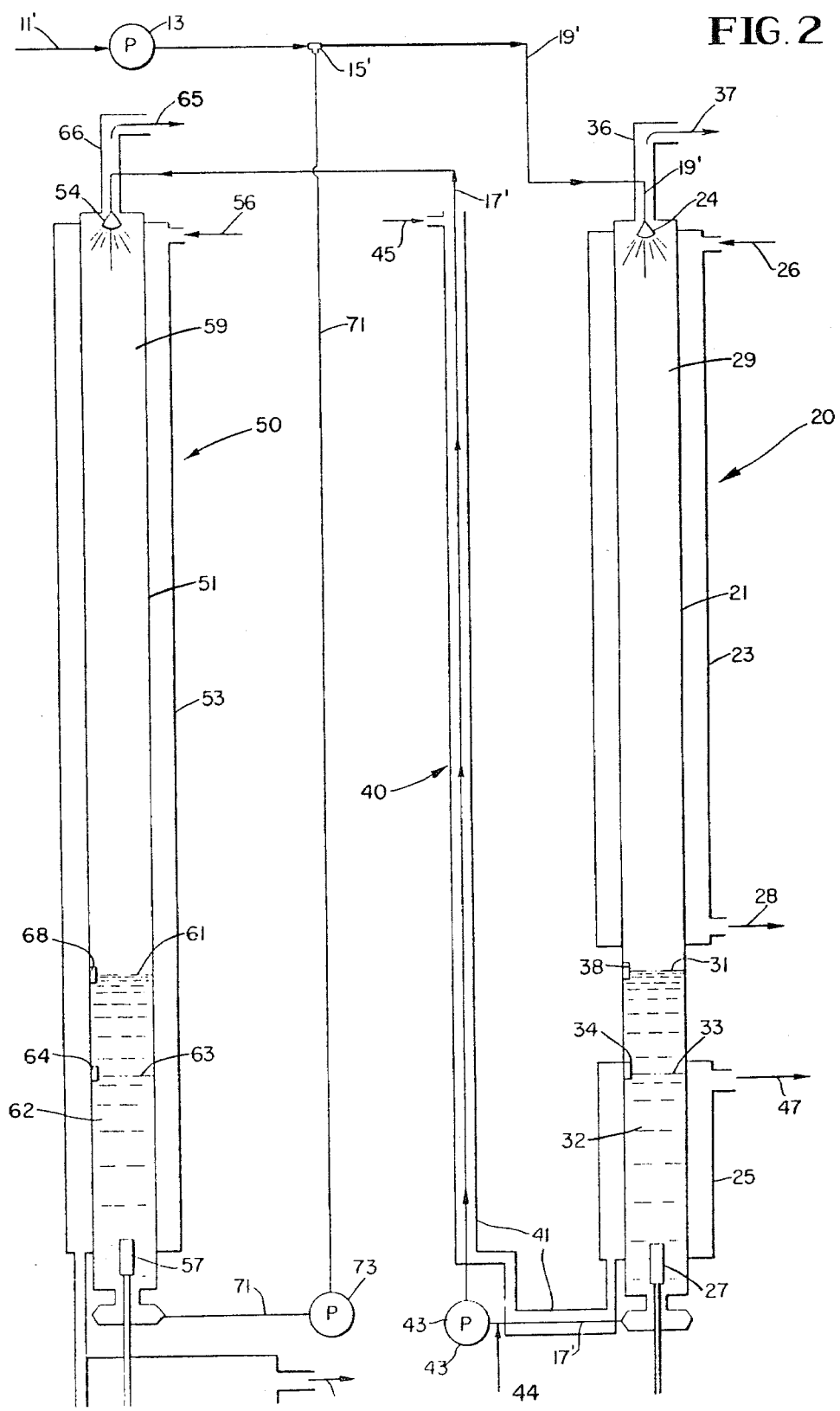
FIG. 2 illustrates a transference apparatus for transferring a sensitive material from a gas/sensitive material mixture to a solvent, and for vaporizing the sensitive material at a selected elevated pressure and in combination with a selected gas.

FIG. 2 shows a transference apparatus for transferring a sensitive material (e.g., acrolein, methacrolein, acrylic acid or methacrylic acid) present as a vapor in one gas/vapor stream at one pressure, to a vapor at a selected different pressure, which is often a relatively elevated pressure, in another selected gas/vapor stream which may contain a gas to be reacted with the sensitive material in the presence of a catalyst or catalysts or under conditions different from those present in the vaporization tower.

The vaporization tower 20 functions as described for the second process embodiment, but the cooled solvent, relatively stripped of sensitive material, in stream 17 is directed as stream 17' to a suitable spray head 54 at the top of scrubbing tower 50 where it is directed downwardly as droplets within the upper interior space 59. Here the rising mixture of gas and vaporized acrolein, for example, is cooled by both the spray of droplets and by cooling water circulating inside of cooling jacket 53. The heat transfer surface may be finned to increase its effectiveness. The falling droplets absorb the desired sensitive material from the rising mixture of gas and vapor and fall to a liquid pool 62 through which an acrolein-rich gas/vapor stream is passed via a sparging head 57 after being cooled by the precooler 68. Under some conditions where the gas stream 65 is hot enough, as it is in the case of acrolein, precooler 68 can be designed as a boiler where the steam 77 thus generated is fed to the heating jacket 23 of vaporizing tower 20 as steam 26, thus conserving energy.

The warmed solvent 71, containing a high load of sensitive material, is rapidly pumped from liquid pool 62 to vaporizing tower 20 by pump 73. At mixing tee 15', additional liquid sensitive material 11', as the same sensitive material, such as acrolein, in the hot gas-vapor stream 65, or as a volatile liquid co-reactant, can be injected by metering pump 13 to form mixed stream 19', demisting zones 36 and 66 remove entrained droplets of solvent.

The following examples are illustrative of specific embodiments of the present invention processes. As it is apparent to those skilled in the art in the light of the foregoing disclosure numerous modifications are possible in the practice of this invention without departing from the scope or concept thereof.

EXAMPLE I

A cylindrical spray tower approximately 72 inches long and of 1½ inches inside diameter was provided with a steam or hot oil jacket along the upper 42 inches and with a cooling jacket along the lower 18 inches. A coaxially disposed gas inlet line terminating in a sintered stainless steel sparger was attached to the bottom of the tower such that the sparger was above the level of the liquid withdrawal pipe. This liquid draw-off line, after a drain valve, was reduced to ¼" stainless steel tubing that ran coaxially inside ¾" tubing through which cooling water passed. It then entered a gear pump capable of 40 gallons/hr., and then it ran, still inside a cooling jacket, to the top of the spray tower where a mixing tee was located, and thence to a liquid injection nozzle inside the spray tower, so arranged that the falling liquid droplet stream would not contact the walls of the spray tower in the heated zone. The mixing tee allowed an ⅛" stainless steel line to enter the ¼" liquid recirculating line coaxially, and through it entered a metered amount of sensitive material.

In this example, the sensitive material was acrolein, fed at a rate of about 35.5 grams per hour. The gas entering the sparger was hydrogen at 1000 psig flowing at a rate of 1.5 liters per minute when measured at standard conditions. A solvent, n-butyl phthalate, was employed at the 25 mole percent level and the inside of the falling spray portion of the tower was maintained at 120° C. by 15 psi steam in the heating jacket. The 999 psig exit steam contained 8.7 percent acrolein vapor which was delivered to a catalytic reactor at the rate of 35.4 grams of acrolein per hour. The acrolein solvent solution contained 0.5% hydroquinone as a polymerizable inhibitor.

EXAMPLE II

The same device as described in EXAMPLE I was employed with ethylene as a carrier gas at 200 psig, and the heating jacket maintained at 130° C. by the use of hot oil, to feed acrylic acid at the rate of 12 grams per hour (2.4% of the feed stream) to an esterification reactor. Approximately 225 grams of Dowtherm 550 was used as a solvent/diluent and 75 grams of acrylic acid was maintained in the circulating liquid through metered addition of acrylic acid. The acrylic acid did not show significant dimerization under NMR examination after one week of operation. The acrylic acid contained 0.5% methylhydroquinone as an inhibitor.

EXAMPLE III

The same apparatus as described in EXAMPLE I was employed to feed acrylic acid to an ethylene stream for esterification. Hot oil was used to heat the hot zone to 150° C. Ethylene was fed at 215 psia and at a flow rate of 2000 cc/min (measured at 20° C., 760 mm Hg) to the system and the resulted stream contained 5% acrylic acid (a partial pressure of 10.75 psia acrylic acid). The liquid pool at the bottom in the cool zone contained 50 mole percent n-butyl phthalate and 50 mole percent acrylic acid, with the acrylic acid being metered in at a sufficient rate to maintain this concentration.

What is claimed is:

1. A process for converting a heat sensitive organic material from a liquid state to a vapor state at an elevated pressure in combination with a carrier gas which comprises:
    A. In a primary vaporization stage of a tower maintained at a selected pressure, passing liquid sensitive organic material downwardly and countercurrently to an ascending carrier gas which heats said sensitive material to vaporize at least a portion of said sensitive material to said vapor state and form a gas/vapor mixture, said carrier gas being heated by contact with a heated inner surface of said tower;
    B. removing said gas/vapor mixture from said primary vaporization stage;
    C. collecting the unvaporized portion of said sensitive material as a liquid pool at the bottom of said tower;
    D. as a secondary vaporization stage, generating a stream of bubbles of said carrier gas at the bottom of said liquid pool; and E. cooling and circulating the contents of said liquid pool to, and mixing with, said liquid sensitive material to form a liquid mixture before passage thereof to said primary vaporization stage.

2. A process in accordance with claim 1 wherein the liquid mixture is fed to a liquid dispersal means for creating a large liquid surface in contact with the ascending carrier gas.

3. A process in accordance with claim 2 wherein the liquid dispersal means is a spray nozzle which directs a spray of fine droplets of the liquid mixture downwardly into said primary vaporization stage with minimum contact with the heated inner surface of said tower.

4. A process in accordance with claim 1 wherein the selected pressure is below atmospheric pressure and the gas/vapor mixture is compressed to the elevated pressure after removal thereof from said primary vaporization stage.

5. A process in accordance with claim 1 wherein the liquid state is substantially pure sensitive material, and the heating in said primary vaporization stage is accomplished at a sufficiently low temperature to minimize decomposition or polymerization of the sensitive material.

6. A process in accordance with claim 1 wherein the liquid pool contains between about 20 and 90 weight percent of an inert high-boiling solvent for said sensitive material, based on the total weight of the liquid pool.

7. A process in accordance with claim 1 wherein the height of the liquid level of the liquid pool is measured and controlled, and make-up solvent is added as required.

8. A process in accordance with claim 1 wherein the carrier gas is unreactive with the sensitive material.

9. A process in accordance with claim 1 wherein the carrier gas is selectively reactive with the sensitive material under conditions not prevailing in said primary and secondary vaporization stages.

10. A process in accordance with claim 1 wherein the sensitive material is acrolein.

11. A process in accordance with claim 1 wherein the sensitive material is methacrolein.

12. A process in accordance with claim 1 wherein the sensitive material is acrylic acid.

13. A process in accordance with claim 1 wherein the sensitive material is methacrylic acid.

14. A process in accordance with claim 6 wherein the inert solvent has a boiling point in the range between about 200° C. and 350° C.

15. A process in accordance with claim 1 wherein the inert solvent medium is a mixture of solvents having a boiling point of at least 75° C., and which additionally contains an antioxidant and a polymerization inhibitor.

16. A process in accordance with claim 6 wherein the sensitive organic material is acrolein, and the inert solvent functions to absorb acrolein from the gaseous effluent of a vapor-phase reaction zone for partial oxidation of propylene to form a solvent-acrolein solution, and said solvent-acrolein solution is introduced into the primary vaporization stage wherein the acrolein is transferred to the carrier gas stream.

17. A process in accordance with claim 16 wherein said carrier gas stream comprises hydrogen.

18. A process in accordance with claim 6 wherein the sensitive organic material is methacrolein, and the inert solvent functions to absorb methacrolein from the gaseous effluent of a vapor-phase reaction zone for partial oxidation of isobutylene to form a solvent-methacrolein solution, and said solvent-methacrolein solution is introduced into the primary vaporization stage wherein the methacrolein is transferred to the carrier gas stream.

19. A process in accordance with claim 18 wherein said carrier gas stream comprises hydrogen.

20. A process in accordance with claim 6 wherein the sensitive organic material is acrylic acid, and the inert solvent functions to absorb acrylic acid from the gaseous effluent of a vapor-phase reaction zone for oxidation of propylene to form a solvent-acrylic acid solution, and said solvent-acrylic acid solution is introduced into the primary vaporization stage wherein the acrylic acid is transferred to the carrier gas stream.

21. A process in accordance with claim 20 wherein said carrier gas stream comprises hydrogen.

22. A process in accordance with claim 6 wherein the sensitive organic material is methacrylic acid, and the inert solvent functions to absorb methacrylic acid from the gaseous effluent of a vapor-phase reaction zone for oxidation of isobutylene to form a solvent-methacrylic acid solution, and said solvent-methacrylic acid solution is introduced into the primary vaporization stage wherein the methacrylic acid is transferred to the carrier gas stream.

23. A process in accordance with claim 22 wherein said carrier gas stream comprises hydrogen.

* * * * *